UNITED STATES PATENT OFFICE.

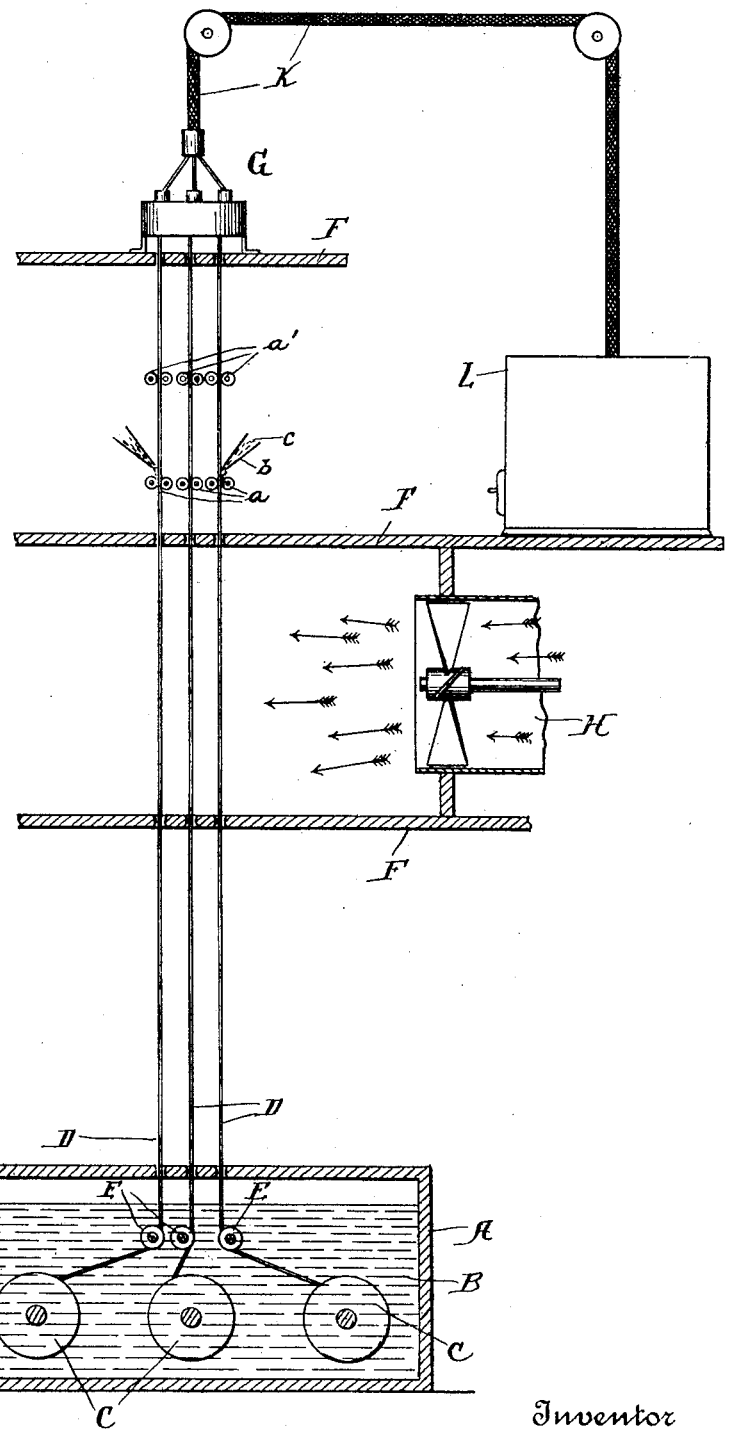

ISIDOR KITSEE, OF PHILADELPHIA, PENNSYLVANIA.

INSULATING ELECTRIC CONDUCTORS.

SPECIFICATION forming part of Letters Patent No. 703,135, dated June 24, 1902.

Application filed April 17, 1902. Serial No. 103,437. (No model.)

*To all whom it may concern:*

Be it known that I, ISIDOR KITSEE, of the city and county of Philadelphia, State of Pennsylvania, have invented certain new and useful Improvements in Insulating Electric Wires, (Case No. 121,) of which the following is a specification.

My invention relates to an improvement in insulating electric wires.

The object of my invention is to produce economically an insulating-covering for wires of comparative high resistance.

In later years attempts were made to substitute for the dear caoutchouc or gutta-percha a cheaper material consisting of amorphous cellulose—that is, a cellulose made soluble either through the nitrating or hydrating processes and then dissolved with the aid of either alcohol and ether combined, acetone, amyl acetate, or any of the well-known solvents. This insulation was mostly used as a very thin coating, so as to enable a comparatively large number of conductors to be assembled in a comparatively small space; but in the employment of dissolved cellulose as an insulator for electric wires four great disadvantages are encountered. First, the resistance value of dissolved cellulose *per se* is far less than the resistance value of gutta-percha or rubber. Second, in coating the wire with a film of dissolved cellulose the evaporating of the solvent out of said dissolved cellulose leaves the film in a very porous condition. In this state the resistance value of the film is far less than the resistance value of the solid material produced under pressure. Third, the evaporating and drying out of the solvent will in a comparatively short time leave the film in too brittle a condition. Fourth, dissolved cellulose *per se* if in contact with moisture absorbs the same slowly and loses thereby the greater part of its insulating property. The object of my invention is to obviate these difficulties.

I will state at the outset that the experiments carried out by me had mostly for their object to increase the resistance value of a cellulose compound and also to make such compounds of any degree of flexibility desired and to destroy their tendency to absorb moisture. As a result of these experiments, I find that if sulfur, preferably finely divided and in the shape as is commercially known as "flour of sulfur," is intermixed, either in its elementary state or as a compound, with the dissolved cellulose and then the article subjected to heat, preferably with the aid of pressure, then the resistance value of the finished article is more than doubled and any degree of flexibility may be reached.

In my experiments I have varied the amount of sulfur from as low as two per cent. to as high as ten per cent., considering weight for weight. The heat to which the articles were subjected varied from about 150° to 250°. The result was as follows: With 2 per cent. sulfur the article itself became flexible to a great extent and its resistance was found later on to be about fifty per cent. greater than before. With the addition of ten per cent. sulfur the article became so weak that it could not stand at all without support, but strands made from same could be twisted even after drying into any desired shape without cracking.

The addition of sulfur and the addition of heat to melt this sulfur, or, better, to cure the article, to vulcanize the same, so to speak, has the following advantages: First, it adds to the article a degree of flexibility it otherwise would not possess; second, this degree of flexibility can be regulated in accordance with the percentage of sulfur added; third, the process of curing or vulcanizing with the addition of sulfur gives the article a degree of resistance it formerly did not possess; fourth, it adds to the article the valuable property of a greater degree of resistance to the action of aciduous or other moisture.

In speaking of the addition of sulfur I do not limit myself to sulfur in its elementary state, as any salt of same may be substituted therefor. So, also, may a compound consisting of sulfur partially dissolved in one of the fatty oils or acids be used, but where economy is desired the sulfur shall be used in its powdered state, as was stated above.

Referring to the drawing, which illustrates the preferred method of producing my invention and in which the figure is a vertical longitudinal sectional view of the apparatus to be used in the covering of individual conductors and producing of same a compound cable, A represents a reservoir; B, the insulating solution contained therein; C, the reels of wire; D, the wire.

E represents guide-rolls to guide the wire passing upward through the orifices or holes in the floors or partitions F to the braiding-machine G.

H is an apparatus for throwing a current of air, preferably heated, on the wire, so as to hasten the evaporation of the solvent, thereby drying the insulation.

*a* represents rollers preferably provided with soft-rubber cushions. These rollers are adapted to press tightly against the wire for the purpose of compressing again the coating which became partially porous through the drying process.

*b* represents chutes or sprayers containing sulfur in the powdered state. This device is adapted to spray upon the outer surface of the non-conducting coating the powdered sulfur in a manner so as to fill up the pores still left in the insulation.

*a'* represents additional rollers substantially as the rollers *a* and performing the same function, with the addition that they compress the sulfur into the pores of the insulation.

K is the finished cable; L, the heated space or room for curing or vulcanizing.

I will now describe the preferred method of providing the individual wire with insulation in accordance with this my invention.

The insulating compound, consisting of dissolved cellulose with the addition of sulfur, is placed in a receptacle, into which are also placed the reels of wires to be insulated. As stated above, the amorphous cellulose may consist of the nitrated cellulose dissolved in one of its solvents; but this product alone does not possess the coherence necessary for the production of a continuous filament on the wire, and it is best to add either camphor or as a substitute therefor one of the fatty oils with the sulfur. In this connection I will state that in the manufacture of articles from celluloid a large amount of so-called "scrap" celluloid is left as a waste product, and as the celluloid used for most of the articles is colored this waste can only be used over again if entirely dissolved and only for the cheapest grades of articles. The price of said scrap is about twenty per cent. of the price of the sheet-celluloid, and as the color for insulation is mostly gray or black the scrap of different colors can be dissolved and the whole be then colored with anilin-black. The sulfur, if in the elementary or powdered state, or the sulfur compound, if used as such, shall be well intermixed with the solution containing the cellulose. It is best to use as a solvent either the slowly-drying amyl acetate or acetic acid.

If celluloid scrap is used, it is well to take for each pound of said scrap, if the same does not contain too much "filling" matter, about one pound amyl acetate and one pound acetone, and as the solvent is comparatively dear it is best to perform the function of coating the wire and drying out the insulation in a closed space provided with means to condense and collect the evaporated moisture of the solvents.

In the rapid manufacture of wires insulated by a compound as described a great disadvantage arises therefrom that if the solvent consists of a rapidly-drying fluid, such as alcohol ether, then the film does not possess the necessary consistency, and if the solvent consists of a fluid drying less rapidly then a comparatively great length of time has to lapse before the coated wires can either be wound on a reel or be made into a cable and provided with an outer wrapping. I therefore in the manufacture of such insulated wires provide part of the space through which these wires are carried after issuing from the insulating solution with a device for throwing an air-draft, preferably of a high temperature, onto the wires, because I have found that if an insulation of a certain thickness will require a certain time to dry in the still air this time is greatly shortened in proportion to the velocity with which the air surrounding the same is caused to travel and also the degree of heat of said air. I do not intend to dry out entirely the insulating-film through this draft of air, but only to bring the film in such condition that it may be handled with safety in the later operations. After traveling through this space, wherein the greater part of the moisture of the solvent is evaporated, the film will become, as said above, more or less porous, and it is necessary, therefore, to compress this film. For this purpose I allow the wire to pass through what I call "compression-rollers." These rollers are preferably provided with a surface capable of being slightly compressed, so as to allow the passage of the wire through a pair of these rollers normally apart from each other a distance much smaller than the space required for the wire. To further guard against the existence of pores, I surround the wire at this junction with devices capable of spreading powdered sulfur on the insulation. Through the semimoist state of the insulation part of this powdered sulfur will be retained on the surface of the same, and with the aid of additional compressing-rollers I compress the finely-powdered sulfur on this surface and into the minute pores which may still be in the insulation. The wire may then be carried singly into the curing or vulcanizing space, or a series of such wires may then be assembled and provided with an outer braiding, such as is illustrated in the drawing, and the cable provided with the braiding may then be carried into the room for the purpose of vulcanizing or curing. This room is heated, preferably, to about 200° to 250° and the cable left therein till the curing process is finished.

I prefer the method wherein the wires are provided with an outer envelop either in the form of a braiding or otherwise, for the reason that the braiding exerts a pressure on the insulating-film, and it is best to have the process of curing to take place with the aid of heat and pressure.

If the braiding consists of fine wires, then it is preferable, to first surround the assembled wires with a wrapping of non-conducting material, as otherwise the metal may cut into the thin film of insulation; but if this braiding consists of cord this precaution is unnecessary.

After the curing or vulcanizing has taken place the cable may be provided with an outer lead tube, as is used in most of the cables wherein a series of wires are assembled.

To prevent the sticking of the non-conducting film after the wire issues from the insulating solution, I prefer to carry the wire through a bath consisting, preferably, of ammonia water, or I carry this wire through a space charged with vapors of ammonia. The carrying of the wire through an ammonia-bath and afterward through compressing-rollers will give to the insulation a smooth, glossy, and therefore finished appearance. Instead of an ammonia-bath the compressing-rollers may be surrounded with a cloth saturated with said ammonia. The presence of ammonia greatly lessens the inflammability of the cellulose film, and is therefore an additional advantage.

If a nitrated cellulose is dissolved in amyl acetate alone, the whole mass swells up and the compound so produced occupies a space more than double the space the compound would occupy after the amyl acetate is entirely dispelled. To obviate this difficulty, one of two methods must be employed: either the wire has to go continuously or repeatedly through compressing-rollers during the process of drying or the amyl acetate should be sparingly added to a solvent consisting of acetone. In my experiments I have found that if acetone is used and only ten per cent. of amyl acetate is added to it the too quickly drying out is entirely prevented and the dissolved mass will not be as bulky in comparison to its weight as if amyl acetate alone is used.

Acetic acid has the great advantage that the mass when dried is not as porous as when dissolved in the other solvents; but it has the disadvantage that the drying out is a very slow process, especially if the film is of any considerable thickness. To the advantages may also be added that the acetic acid gives to the film a greater toughness than any of the other solvents.

I have illustrated in the drawing only two sets of compressing-rollers; but it is understood that these compressing-rollers may be duplicated or any other device performing the same function may be substituted therefor. In fact, all the places where the wire has to pass through holes or perforations may be provided with means to compress the non-conducting film.

Having now described my invention, what I claim as new, and desire to secure by Letters Patent, is—

1. The method of covering electric conductors which consists in coating said conductors with a cellulose solution containing sulfur or its compound and then curing or vulcanizing said coating.

2. The method of covering electric conductors which consists in coating said conductors with a compound containing dissolved cellulose and sulfur or its compound and then curing or vulcanizing the coating by the application of heat.

3. The method of covering wire which consists in passing it through a solution of dissolved cellulose and sulfur or its compound and then passing it through a temperature of a degree capable of melting said sulfur or its compound.

4. The process of insulating electric conductors which consists in the following steps: first, coating the conductor with a solution containing a non-conducting compound; second, accelerating the drying out of said coating through the application of a draft of air; third, compressing said coating, and, fourth, curing or vulcanizing said coating.

5. In the process of insulating electric conductors; the following steps to wit: first, the coating of said conductor with an insulating compound containing its solvent; second, compressing said coating left porous through evaporation of said solvent.

6. In the process of insulating electric conductors, the following steps to wit: first, coating said conductor with an insulating compound containing its solvent; second, providing the outer surface of said insulating-coating with a spray of sulfur.

7. In the process of insulating electric conductors, the following steps to wit: first, coating said conductor with an insulating compound containing its solvent; second, providing the outer surface of said insulating-coating with a spray of sulfur; third, compressing said sulfur into the pores of said coating.

8. In the process of insulating electric conductors, the following steps to wit: first, coating said conductor with an insulating compound containing its solvent; second, providing the outer surface of said insulating-coating with a spray of sulfur; third, compressing said sulfur into the pores of said coating, and, fourth, curing or vulcanizing said coating with the aid of heat.

9. An electric cable consisting of a series of individual wires, insulated from each other by amorphous cellulose containing sulfur and cured or vulcanized with the aid of heat.

10. The process of insulating electric wires which consists in surrounding said wire with an insulating material containing its solvent, and after partially drying the same, subjecting it to pressure to decrease the porosity due to the evaporation of the solvent.

11. The process of insulating electric conductors, said process consisting in providing the conductor with an insulating material and providing the outer surface of said insulating material with sulfur.

12. The process of insulating electric conductors which consists in surrounding the conductor with an insulating material and providing said insulating material with a spray of a second insulating material, said second material adapted to melt at a temperature not injuriously affecting the first insulating material.

13. As a new article of manufacture, an insulated wire consisting of the wire proper and an insulating-coating enveloping said wire, said insulating-coating consisting of amorphous cellulose, cured or vulcanized in the presence of sulfur with the aid of heat.

In testimony whereof I hereby sign my name, in the presence of two subscribing witnesses, this 21st day of March, A. D. 1902.

ISIDOR KITSEE.

Witnesses:
EDITH R. STILLEY,
CHAS. KRESSENBUCH.